United States Patent
Kanevsky et al.

(10) Patent No.: US 9,570,074 B2
(45) Date of Patent: Feb. 14, 2017

(54) BEHAVIOR ADJUSTMENT USING SPEECH RECOGNITION SYSTEM

(71) Applicant: Google Inc., Mountain View, CA (US)

(72) Inventors: Dimitri Kanevsky, Ossining, NY (US); Golan Pundak, New York, NY (US)

(73) Assignee: Google Inc., Mountain View, CA (US)

(*) Notice: Subject to any disclaimer, the term of this patent is extended or adjusted under 35 U.S.C. 154(b) by 219 days.

(21) Appl. No.: 14/557,751

(22) Filed: Dec. 2, 2014

(65) Prior Publication Data
US 2016/0155437 A1    Jun. 2, 2016

(51) Int. Cl.
| G10L 15/04 | (2013.01) |
| G10L 15/00 | (2013.01) |
| G10L 21/00 | (2013.01) |
| G10L 17/00 | (2013.01) |
| G10L 15/22 | (2006.01) |
| G09B 19/04 | (2006.01) |
| G10L 15/02 | (2006.01) |
| G10L 15/187 | (2013.01) |
| G10L 25/63 | (2013.01) |

(52) U.S. Cl.
CPC .............. *G10L 15/22* (2013.01); *G09B 19/04* (2013.01); *G10L 15/187* (2013.01); *G10L 25/63* (2013.01); *G10L 2015/025* (2013.01)

(58) Field of Classification Search
None
See application file for complete search history.

(56) References Cited

U.S. PATENT DOCUMENTS

| 5,865,626 | A | 2/1999 | Beattie | |
|---|---|---|---|---|
| 6,370,503 | B1 | 4/2002 | Ortega | |
| 6,424,935 | B1 * | 7/2002 | Taylor | G10L 15/005 704/10 |
| 6,853,971 | B2 * | 2/2005 | Taylor | G10L 15/005 704/10 |
| 7,103,542 | B2 * | 9/2006 | Doyle | G10L 15/01 704/231 |
| 7,668,710 | B2 * | 2/2010 | Doyle | G10L 15/01 704/231 |
| 8,073,693 | B2 * | 12/2011 | Ljolje | G10L 15/187 704/254 |
| 8,131,548 | B2 | 3/2012 | Blass | |
| 8,306,822 | B2 | 11/2012 | Li | |

(Continued)

*Primary Examiner* — Satwant Singh
(74) *Attorney, Agent, or Firm* — Fish & Richardson P.C.

(57) ABSTRACT

Methods, systems, and apparatus are described for inducing a user of a speech recognition system to adjust their own behavior. For example, in one implementation, a speech recognition system that allows children to control electronic devices can improve the child's speech development, by encouraging the child to speak more clearly. To do so, the speech recognition system can generate a phonetic representation of a term spoken by the child, and can determine whether the phonetic representation matches a particular canonical pronunciation of the particular term that is deemed age-appropriate for the child. Upon determining that the particular canonical pronunciation that matches the phonetic representation of the term spoken by the child is not age-appropriate, the speech recognition system can select and implement a variety of remediation strategies for inducing the child to repeat the term using a pronunciation that is considered age-appropriate.

20 Claims, 4 Drawing Sheets

(56) References Cited

U.S. PATENT DOCUMENTS

| | | | | |
|---|---|---|---|---|
| 8,862,470 B2 * | 10/2014 | Ljolje | ................... | G10L 15/187 704/254 |
| 9,275,637 B1 * | 3/2016 | Salvador | ................. | G10L 15/01 |
| 9,431,011 B2 * | 8/2016 | Ljolje | ................... | G10L 15/187 |
| 2009/0024183 A1 * | 1/2009 | Fitchmun | ........... | A61N 1/36032 607/56 |
| 2012/0077155 A1 * | 3/2012 | Siani | ........................ | G09B 5/06 434/156 |
| 2013/0166283 A1 * | 6/2013 | Han | ........................ | G10L 15/28 704/9 |
| 2015/0170642 A1 * | 6/2015 | Peng | .................... | G10L 15/187 704/235 |
| 2015/0194166 A1 * | 7/2015 | Fitchmun | ........... | A61N 1/36032 704/249 |

* cited by examiner

BEHAVIOR ADJUSTMENT USING SPEECH RECOGNITION SYSTEM

FIELD

The present specification relates to automated speech recognition (ASR).

BACKGROUND

When speaking to an adult, a small child may be motivated to speak clearly, so as to avoid miscommunication. Given the capabilities of modern ASR systems to accurately recognize a wide range of speech, including words that are incorrectly pronounced, a small child may be less motivated to speak clearly when speaking a command into a computing device.

SUMMARY

Methods, systems, and apparatus are described for encouraging a user of a speech recognition system to adjust their own behavior. For example, in one implementation, a speech recognition system that allows children to control electronic devices can improve the child's speech development, by encouraging the child to speak more clearly. To do so, the speech recognition system can generate a phonetic representation of a term spoken by the child, and can determine whether the phonetic representation matches a particular canonical pronunciation of the particular term that is deemed age-appropriate for the child. Upon determining that the particular canonical pronunciation that matches the phonetic representation of the term spoken by the child is not age-appropriate, the speech recognition system can select and implement a variety of remediation strategies for inducing the child to repeat the term using a pronunciation that is considered age-appropriate.

In some implementations, the speech recognition system can be used to improve other aspects of a user's behavior such as, for example, improving an adult user's speech pronunciations, or improving a user skill level in the pronunciation of particularly difficult words. In other implementations, the speech recognition system can be used to help users improve or learn pronunciation of different terms in a language when, for example, a person learns a new language. In such instances, the speech recognition system can be used to help children and/or adults to learn to pronounce different terms of the new language appropriately.

In general, another innovative aspect of the subject matter described in this specification can be embodied in methods that include the actions of receiving audio data corresponding to a user speaking a particular term, generating a phonetic representation of the particular term based on the audio data, and that the phonetic representation matches a particular canonical pronunciation of a particular term, where the particular canonical pronunciation is associated with an indication of age-appropriateness. The actions also include obtaining data that indicates an age of the user, determining, based on a comparison of (i) the data that indicates the age of the user and (ii) indication of age-appropriateness that is associated with the particular canonical pronunciation of the particular term, that the pronunciation of the particular term by the user is not age-appropriate, and, based on determining that the pronunciation of the particular term by the user is not age appropriate, selecting a remediation strategy for inducing the user to speak the particular term using an age-appropriate pronunciation.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For example, the actions may include selecting, from among a plurality of canonical pronunciations stored in a phonetic dictionary, the particular canonical pronunciation as a best match of the phonetic representation generated of the particular term. The actions may include storing, in the phonetic dictionary, a plurality of canonical pronunciations associated with the particular term, wherein the plurality of canonical pronunciations includes the particular canonical pronunciation selected for the particular term, and wherein two or more of the plurality of canonical pronunciations include an indication of age-appropriateness. The indication of age-appropriateness may be a maximum age, and determining that the pronunciation of the particular term by the user is not age-appropriate may include determining that the age of the user is greater than the maximum age. The remediation strategy for inducing the user to speak the particular term using an age-appropriate pronunciation may involve prompting the user to speak the particular term again, or outputting audio data corresponding to a pronunciation of the particular term that not age-appropriate, or outputting the received audio data corresponding to the user speaking the particular term. Outputting audio data corresponding to a pronunciation of the particular term that is not age-appropriate may include generating a text-to-speech output using the particular canonical representation that matches the phonetic representation. The remediation strategy for inducing the user to speak the particular term using an age-appropriate pronunciation may involve (i) selecting another canonical pronunciation of the particular term that is determined to be age-appropriate, and (ii) outputting audio data corresponding to the selected other canonical pronunciation, or initiating an action associated with the particular term despite the determination that the pronunciation of the particular term by the user is not age-appropriate. The actions may include, before selecting a remediation strategy, obtaining biometric data associated with the user, and determining that the biometric data satisfies a predetermined emotional threshold, where the remediation strategy may be selected based on determining that the biometric data satisfies the predetermined emotional threshold. The remediation strategy for inducing the user to speak the particular term using an age-appropriate pronunciation may involve (i) detecting another person within a predetermined distance of the user, and (ii) sending a message to the other person indicating that the pronunciation of the particular term by the user is not age-appropriate.

The details of one or more implementations are set forth in the accompanying drawings and the description below.

BRIEF DESCRIPTION OF THE DRAWINGS

Like reference numbers and designations in the various drawings indicate like elements.

DETAILED DESCRIPTION

Figure 1:
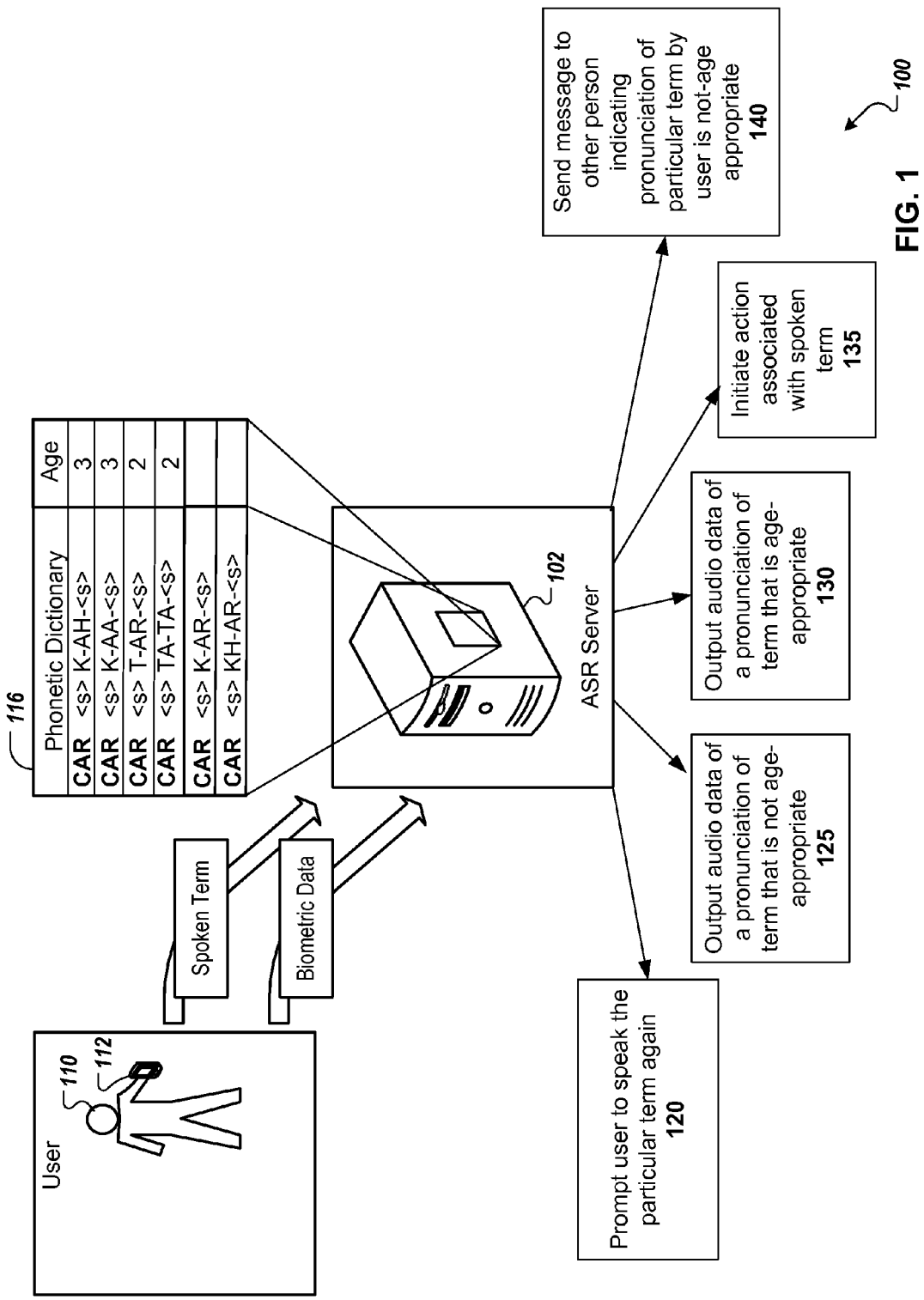
FIGS. 1 and 2 are diagrams of example systems that can induce a user of a speech recognition system to adjust their own behavior.

Methods, systems, and apparatus are described for inducing a user of a speech recognition system to adjust their own behavior. In one implementation, ASR systems may be used to transcribe sound utterances made by a user such as, for example, a child. Some speech recognition systems may use phonetic dictionaries that includes lists of words or terms and their age-appropriate phonetic spellings when performing transcription. Sounds produced when a user speaks can be received, and are transcribed by the ASR systems to phones or phonemes, which are representations of the sounds units included in the utterance. The transcribed phones are used to identify possible corresponding words, by referencing a phonetic dictionary that includes different age-appropriate canonical phone sequences, or pronunciations, of a variety of words.

In one implementation, an ASR system that allows children to control electronic devices can improve the child's speech development, by encouraging the child to speak more clearly. The ASR systems can generate a phonetic representation of a spoken term by a child and determine if the phonetic representation matches a particular canonical pronunciation of the particular that is age-appropriate that is stored in an age-restricted phonetic dictionary.

Upon determining that the phonetic representation of the spoken term by the child is not age-appropriate, the ASR systems can implement a variety of remediation strategies that can improve child speech development and can also allow children to control electronic devices. In other implementations, the ASR system can be used to help users improve or learn pronunciation of different terms in a language when, for example, users such as children and/or adults immigrate to a new country and are learning a new language. In such instances, the ASR system can be used to help children and/or adults to learn to pronounce different terms of the new language appropriately. In such instances, an indication of age appropriateness may not be applied directly to a child as the child may need additional time to learn to speak or pronounce terms correctly. In yet other implementations, the speech recognition system can be used to help children with, for example, speech development deficiencies that can adversely affect speech development, to learn to pronounce different terms in a language appropriately.

Examples of remediation strategies the ASR system can implement upon determining that the phonetic representation of the spoken term by the child is not age-appropriate include, in some instances, generating an audio signal that can prompt the user to speak the particular term again. This remediation strategy can encourage the user to improve the pronunciation of the term in the repeat cycle.

In other instances, the remediation strategy can include generating an audio signal that outputs a canonical pronunciation of the term that is not age-appropriate back to the user. The audio signal output can be substantially identical to the audio data received by the ASR system corresponding to the user speaking the particular term.

In other instances, the remediation strategy can include generating an audio signal that outputs an age-appropriate, canonical pronunciation of the term back to the user. This remediation strategy can encourage the user to learn the age-appropriate pronunciation of the particular term from listening to the audio data output from the ASR system.

In other instances, the remediation strategy can include initiating an action associated with the particular term spoken by the user despite the determination that the pronunciation of the particular term by the user is not age-appropriate. This remediation strategy can be implemented when, for example, an ASR system can detect the user is likely in a state of anger, high anxiety, or any other adverse emotional state as discussed in greater detail below.

In yet other instances, the remediation strategy can include generating and sending a signal or a message to another person within a pre-determined distance of the user indicating that the pronunciation of the particular term by the user is not age-appropriate, which can prompt the person to help improve the pronunciation of the term by the user.

FIG. 1 is a diagram of an example system 100 that can induce a user of a speech recognition system to adjust their own behavior. In particular, FIG. 1 shows a system 100 that can induce a child to adjust the pronunciation of their spoken terms. In further detail, the system 100 includes an ASR server 102 that includes an age-restricted phonetic dictionary 116 and a computing device 112 that can be operated by a user 110, e.g., a small child.

The computing device 112 and/or the ASR server 102 can include a database that includes user profiles associated with the different users 110. Information stored in a user profile can include, for example, the user age, date of birth, geographic location, and contact information of the user's relatives. In FIG. 1, a user 110 can speak into the computing device 112 to attempt to input a term to the ASR server 102. Examples of the computing device can include a smartphone, a voice over Internet Protocol (VoIP) phone, a personal computer with a microphone, or another suitable device. Examples of spoken terms can include voice queries, commands, communications, etc.

The computing device 112 can detect the term spoken by the user and can generate an audio signal that is representative of the sounds contained within the spoken term. The computing device 112 can transmit the audio signal to the ASR server 102. Upon receiving the audio signal, for example, the ASR server 102 can analyze acoustic signals included in the audio signal, and can compute and classify sound features to identify a series of phones and thus generate a phonetic representation of the particular term spoken by the user 110 from the audio signal. The ASR server 102 can also obtain the age of the user 110 from, for example, a database stored in the ASR server 102 and/or the computing device 112. The ASR server 102 can associate the age of the user with the generated series of phones.

The ASR server 102 can include or be operably coupled to one or multiple age-restricted phonetic dictionaries 116 that may include a list of terms and age-appropriate pronunciations of the terms. These pronunciations may include phonetic representations, or sequences of phones or phonemes that are associated with the terms.

Development of speech in children occurs in phases where at certain ages, a child is able to pronounce a first set of terms according to a pre-determined set of phonetic properties and is unable to pronounce a second set of terms according to a pre-determined set of phonetic properties, where the first set of terms is different from the second set of terms. An indication of age-appropriateness represents a set of canonical pronunciations of terms that a child is expected to pronounce according to a pre-determined set of phonetic properties at a given age. A user can pronounce a term in an age-appropriate manner if the user pronounces the term with the age-appropriate phonetic properties. Additionally, a user can pronounce a term or a word in a manner that is not age-appropriate if the user does not pronounce the term or the word with the age-appropriate phonetic properties.

For example, as shown in FIG. 1, the term "car" has multiple canonical pronunciations in the age-restricted phonetic dictionary 116. The multiple canonical pronunciations of the term "car" includes the pronunciation "<s>k-ah-<s>" that is age-appropriate for a three year old child, the pronunciation "<s>k-aa-<s>" that is age-appropriate for a three year old child, the pronunciation "<s>t-ar-<s>" that is age-appropriate for a two year old child, and the pronunciation "<s>ta-ta-<s>" that is age-appropriate for a two year old child. Additionally, the age-restricted phonetic dictionary 116 also includes the canonical pronunciations "<s>k-ar-<s>" and "<s>kh-ar-<s>" that does not include an explicit an indication of age-appropriateness, meaning that the canonical pronunciation is appropriate for speakers of any age.

Note that not all canonical pronunciations of a particular term in the age-restricted phonetic dictionary 116 are associated with an indication of age-appropriateness. This is because in some implementations, the system 100 can be used to improve other aspects of a user's behavior such as, for example, improving an adult user's speech pronunciations, andimproving a user skill level in the pronunciation of particularly difficult words. In yet other implementations, the system 100 can be used to help users improve or learn pronunciation of different terms in a language when, for example, a user learns a new language. In such instances, the system 100 can be used to help children and/or adults to learn to pronounce different terms of the new language appropriately. In such instances, an indication of age appropriateness may not be applied directly to a user, e.g., a child or an adult in a family, as the user may need additional time to learn to speak or pronounce terms correctly. Furthermore, in other implementations, the system 100 can be used to help children with, for example, speech development deficiencies and/or mental illnesses, e.g., Down's syndrome, that can adversely affect speech development to learn to pronounce different terms in a language appropriately.

Upon receiving acoustic signals associated with an utterance of the word or term "car," for example, the ASR server 102 may identify a series of phones that are representations of speech sounds included in the term. The phones, for example, may be used to reference pronunciations included in the age-restricted phonetic dictionary 116 to identify one or more words (e.g., the word "car") that likely correspond to the term.

After generating the phonetic representation of the particular term spoken by the user, the ASR server 102 can determine if the generated phonetic representation matches a particular canonical pronunciation of a particular term, where the particular canonical pronunciation is associated with an indication of age appropriateness by matching the generated phonetic representations to the entries stored in the age-restricted phonetic dictionary 116. A particular canonical pronunciation from the set of canonical pronunciations shown in the age-restricted phonetic dictionary 116 is selected that best matches the generated phonetic representation of the term or word spoken by the user. The ASR server 102 can compare the generated phonetic representation of the spoken term with a set of stored canonical pronunciations associated with the particular term in the age-restricted phonetic dictionary 116 and quantify the phonetic difference between the generated phonetic representation of the spoken term with a set of stored canonical pronunciations associated with the particular term. The ASR server 102 selects the stored canonical pronunciation that has the smallest difference with the generated phonetic representation of the spoken term.

The ASR server 102 can obtain the age of the user from, for example, the user profile, e.g., a value for age, a date of birth, etc., and can determine based on a comparison of the data that indicates the age of the user, e.g., estimated from the user profile, and the indication of age-appropriateness that is associated with the particular or selected canonical pronunciation of the particular term, e.g., obtained from the age-restricted phonetic dictionary 116, whether the pronunciation of the particular term by the user is age-appropriate. The indication of the age-appropriateness as shown in the age-restricted phonetic dictionary 116 is the expected maximum age of a user that can be associated with any canonical representation of a particular term. This represents the maximum age of the user whose pronunciation of a particular term matches the particular canonical representation.

The ASR server 102 determines if the user spoke an age-appropriate pronunciation of the term by determining if the age of the user is less than or equal to the maximum age associated with the selected canonical representation of the particular term that is stored in the age-restricted phonetic dictionary 116. If the age of the user is less than or equal to the maximum age associated with the selected canonical representation of the particular term, it is determined that the pronunciation of the particular term by the user is age-appropriate. If the age of the user is greater than the maximum age associated with the selected canonical representation of the particular term, it is determined that the pronunciation of the particular term by the user is not age-appropriate. For example, if the phonetic representation generated from the term spoken by the user is "<s>k-ah-<s>," the maximum age associated with the selected canonical representation of the particular term is three years old. If the age of the user is three years or less, the ASR server 102 will determine that the user pronunciation of the particular term by the user is age-appropriate. If the age of the user more than three years old, the ASR server 102 will determine that the pronunciation of the particular term by the user is not age-appropriate.

When the ASR server 102 determines that the pronunciation of the particular term by the user is not age-appropriate, the ASR server 102 can select a remediation strategy from a set of remediation strategies for inducing the user to speak the particular term using an age appropriate pronunciation. A remediation strategy is a strategy or a set of instructions that can be implemented by the ASR server 102 and/or the computing device 112 to encourage a user 110 to speak or pronounce specific words or terms with expected and pre-determined phonetic properties.

In some instances, the ASR server 102 can prompt the user to speak the particular term again 120. The ASR server 102 can generate a signal and transmit the signal to the computing device 112 that instructs the computing device 102 to output audio data to the user 110. The audio data can prompt the user 110 to speak the particular term again. The remediation strategy 120 can encourage the user to improve the pronunciation of the term in the repeat cycle. The remediation strategy 120 can mimic an interaction of the user 110 with an adult, where the adult can ask the user 110 to speak the particular term again if the adult does not understand the term spoken by the user 110 in the first attempt.

In other instances, the ASR server 102 can output a canonical pronunciation of the term that is not age-appropriate back to the user. The ASR server 102 can send a signal to the computing device 112 to output audio data corresponding to a pronunciation of the particular term that is not age-appropriate 125. The audio data output by the computing device 112 and represented by the signal sent from the ASR server 102 can be substantially identical to the audio signal received by the ASR server 102 and/or the computing device 112 corresponding to the user speaking a particular term. Outputting audio data can include generating a text-to-speech output using the particular canonical representation that best matches the phonetic representation of the audio data received by the ASR server 102 corresponding to the user speaking the particular term.

The remediation strategy 125 can encourage the user to improve the pronunciation of the particular term and speak the particular term again to the computing device 112. The remediation strategy 125 can mimic an interaction of the user 110 with an adult, where the adult can repeat a "mumbled" pronunciation of a term spoken by the user 110 if the adult does not understand the term spoken by the user 110 in the first attempt.

In other instances, the ASR server 102 can output a canonical pronunciation of the term back to the user that is age-appropriate. The ASR server 102 can send a signal to the computing device 112 to output audio data corresponding to a pronunciation of the particular term that is age-appropriate 130. The ASR server 102 can select another canonical pronunciation of the particular term that is determined to be age appropriate from, for example, the age-restricted phonetic dictionary 116 and send a signal to the computing device 112 to output audio data corresponding to the selected age-appropriate pronunciation of the particular term.

The remediation strategy 130 can encourage the user 110 to learn the age-appropriate pronunciation of the particular term from listening to the audio data output from the computing device 112 and speak the particular term again to the computing device 112. The remediation strategy 130 can mimic an interaction of the user 110 with an adult, where the adult can repeat an age-appropriate pronunciation of a term spoken by the user 110 if the adult detects that the pronunciation of the particular term by the user is not age-appropriate in the first attempt.

In other instances, the ASR server 102 can initiate an action associated with the particular term spoken by the user 135 despite determining that the pronunciation of the particular term by the user is not age-appropriate. The ASR server 102 sends the signal to the computing device 112 to initiate an action associated with the particular term spoken by the user 135 despite the determination that the pronunciation of the particular term by the user is not age-appropriate. Examples of actions can be to display a picture associated with the spoken term on the computing device 112, run an application associated with the spoken term on the computing device 112, play music associated with the spoken term on the computing device 112, and/or the like.

In some instances, the ASR server 102 can receive biometric data associated with the user 110 from the computing device 112. The biometric data can be derived from, for example, image analysis, voice analysis, or by direct measurement with a sensor located on the computing device 112 and/or operably coupled to the computing device 112. The ASR server 102 can select a remediation strategy based on determining that the biometric data identifies that the user 110 is in a state of high emotions. The ASR server 102 can receive from the computing device 112 a set of biometric data associated with the user 110 such as, for example, blood pressure measurements, facial profile, body temperature, skin surface moisture that can be indication of anxiety, and/or the like. The ASR server 102 can use the received biometric data associated with the user to determine if the biometric data satisfies an emotional threshold, e.g., high anxiety levels, high stress levels, high anger levels, etc. The ASR server 102 can select a remediation strategy based on determining that the biometric data satisfies the pre-determined emotional threshold.

For example, in some instances, the ASR server 102 can determine that the user is likely in a state of high stress, frustration, or anxiety, e.g., by blood pressure and skin moisture levels. The ASR server 102 can send a signal to the computing device 112 to initiate an action associated with the particular term spoken by the user despite the determination that the pronunciation of the particular term by the user is not age-appropriate. The remediation strategy can mimic an interaction of the user 110 with an adult, where the adult can initiate an action in response to determining the user 110 is in a state of high anxiety or stress and despite determining the pronunciation of the term spoken by the user is not age-appropriate.

In other instances, the ASR server 102 can detect the presence of another person, e.g., an adult, within a pre-determined distance of the user 110. The ASR server can send a message to the person informing the person that the user 110 has spoken a term with a pronunciation that is not age-appropriate 140, which can prompt the person to help improve the pronunciation of the term by the user 110. The ASR server 102 can receive a signal from the computing device 112 that can indicate the presence of another person, e.g., a parent, a sibling, etc., within a pre-determined distance of the user 110. The ASR server 102 can generate and send a signal or a message to a device associated with the other person indicating that the pronunciation of the particular term by the user is not age-appropriate 140.

For example, the ASR server 102 may store the cellular phone number, email address, or other contact information of the other person. The ASR server 102 can then either send an automated phone message or an automated text or email message to the cellular phone of the other person informing the other person that the pronunciation of the particular term by the user is not age-appropriate. The contact information of the other person can be stored at, for example, the user profile of the user. The remediation strategy 140 can encourage the other person to help the user 110 to improve their pronunciation of the particular term. The remediation strategy 140 can mimic an interaction of the user 110 with an adult, where the adult can be notified of a pronunciation of a term by the user 100 that is not age-appropriate and the adult can be prompted to initiate an action that can help improve the pronunciation of the term by the user 110.

After implementing the appropriate remediation strategy from the list of remediation strategies described above, the ASR server 102 and the computing device 112 can receive additional audio data from the user in response to the applied remediation strategy. The additional audio data may correspond to the user 110 speaking the particular term again. The ASR server 102 can then generate a phonetic representation of the particular term based on the additional audio data. The ASR server 102 can determine if the phonetic representation of the particular term in the additional audio data matches an age-appropriate canonical pronunciation of the particular term in a manner as described above.

In some instances, if the ASR server 102 determines that the phonetic representation of the particular term based on the additional audio input does not match an age-appropriate canonical pronunciation of the particular term, the ASR server 102 can generate a signal to instruct the computing device 112 to implement any of the remediation strategies from the list of remediation strategies discussed above. In other instances, if the ASR server 102 determines that the phonetic representation of the particular term based on the additional audio input does match an age-appropriate canonical pronunciation of the particular term, the ASR server 102 can generate and transmit a signal to instruct the mobile device 112 to initiate an action in response to the particular term spoken by the user 110. The process of implementing remedial strategies and obtaining additional audio input from the user 110 can be repeated in multiple cycles until the ASR server 102 can determine that the user has spoken the particular term with an age-appropriate canonical pronunciation of the particular term.

Note that in other implementations, the system 100 can be used to improve other aspects of a user's behavior such as, for example, improving an adult user's speech pronunciations, improving a user skill level in the pronunciation of particularly difficult words, helping a user learn a new language, helping a user learn a regional pronunciation of any given language, and/or the like. Additionally, the indication of age-appropriateness for the canonical representation of a term in the age-restricted phonetic dictionary 116 being a numerical value for a maximum age is used as an example only. In other implementations, the age-restricted phonetic dictionary 116 can include a representation of a minimum level with a particular canonical pronunciation of a term, where appropriateness can be determined by comparing a characteristic of the user to that minimum level. For example, in cases where a particular pronunciation of a term or the term itself is not appropriate for children or young people, e.g., a potentially offensive term, an indication of appropriateness can be associated with a minimum level as opposed to a numerical value for a maximum age.

Figure 2:
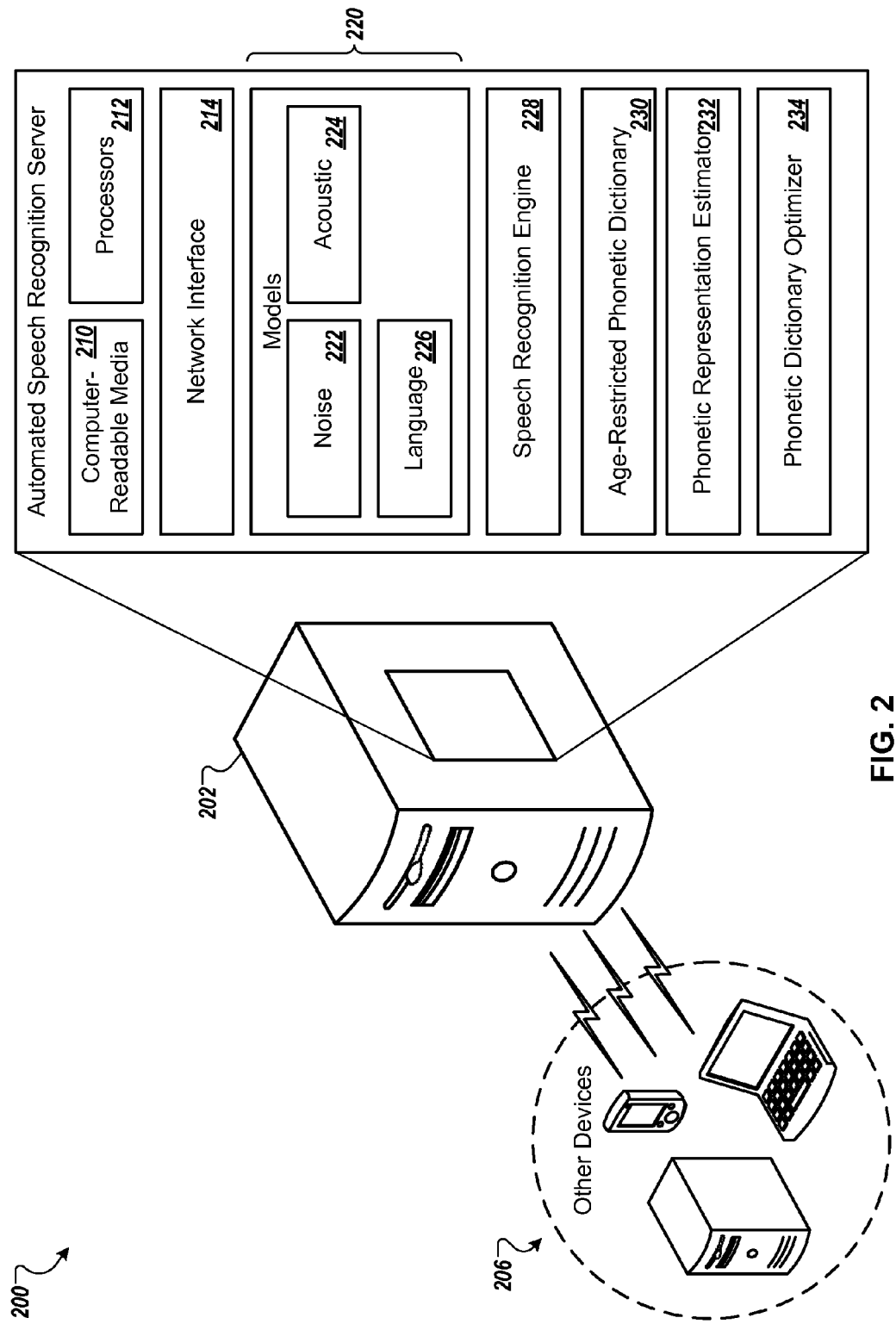

FIG. 2 is a diagram of an example system 200 that can induce a user of a speech recognition system to adjust their own behavior. In particular, FIG. 2 is a diagram of an example system 200 that can induce a child to adjust the pronunciation of their spoken terms. The system 200, for example, may include hardware and/or software components of one or more client computing devices and/or backend servers. The system 200 may include an automated speech recognition server 202, e.g., similar to the ASR server 102, shown in FIG. 1, and one or more other computing devices 206, e.g., portable or stationary client computing devices and/or servers. The speech recognition server 202, and the other computing devices 206 may communicate with each other over various suitable networks, e.g., local area networks (LANs), wide area networks (WANs), the Internet, etc. using wired and/or wireless connections.

The speech recognition server 202 may include computer-readable media 210, e.g., one or more floppy disk devices, hard disk devices, optical disk devices, tape devices, flash memory devices or other similar solid state memory devices, or an array of devices, for storing instructions, e.g., application program code, for performing the processes described herein. Further, the speech recognition server 202 may include one or more processors 212 configured to execute the instructions and to perform various device operations and data processing, and a network interface 214 to transmit data to and receive data from other computing devices, e.g., one or more of the other computing devices 206, etc.

The speech recognition server 202 may use various models 220, such as a noise model 222, an acoustic model 224, and a language model 226 for performing speech recognition. The models 222, 224, and 226, for example, may include data and algorithms to be executed by a speech recognition engine 228. In general, noise models may include acoustic compensation and/or filtering mechanisms to reduce noise levels in audio signals. Acoustic compensation, for example, may digitally simulate the operation of a noise-cancelling microphone, using a sample of a noise field. Noise filtering, for example, may selectively limit components of an audio signal with respect to a given basis. In general, acoustic models may model contextual phonetic information across a population of speakers. To generate or "train" an acoustic model, for example, voice data, e.g., audio recordings of various speakers, and corresponding transcriptions may be analyzed and compiled into statistical representations of sounds that are included in various terms. In general, language models may model the probabilities of various word sequences. A language model, for example, may be implemented as a series of n-grams, where the probability of a complete sentence occurring is the combined probability of the n-gram components. By using n-grams, for example, probability estimates may be generated for sentences that may not be represented in existing training data.

The speech recognition engine 228, for example, may coordinate and execute various models, e.g., the noise model 222, the acoustic model 224, and the language model 226, and may access various phonetic dictionaries, e.g., age-restricted phonetic dictionary 230, to perform speech recognition and transcription. In the present example, the acoustic model 224 and the language model 226 may initially be trained, and parameters, e.g., representations of normalized frequency counts or histograms, associated with each of the models may be estimated. After training the acoustic model 224 and the language model 226, for example, the models may be compiled, and a search graph may be constructed from a combination of the models and phonetic representations, e.g., pronunciations, from the age-restricted phonetic dictionary 230.

After compiling the models 224, 226, for example, a search may be performed to identify an optimal path that aligns a sequence of feature vectors associated with a current utterance or spoken term to the search graph. To transcribe an utterance of a term or a phrase, e.g., "the cat died," the speech recognition engine 228 may use the noise model 222 to perform pre-processing, e.g., noise filtering, of acoustic signals associated with the utterance, and may coordinate the models, e.g., using a search graph, to identify a path that best matches the utterance or the spoken term. The path for a particular hypothesis, e.g., the sentence "the cat died," may include the sequence of context-dependent phonetic units as described by the age-restricted phonetic dictionary 230, together with acoustic scores for the acoustic model 224 associated with each phonetic context in the corresponding string of phones, together with n-gram priors from the language model 226.

The age-restricted phonetic dictionary 230, e.g., similar to the age-restricted phonetic dictionary 116, shown in FIG. 1, may be implemented using databases, file systems, and/or other suitable data storage and retrieval mechanisms, and may include various terms, i.e., words, phrases, etc., in association with one or more possible phonetic representations, e.g., pronunciations, of each of the terms. For example, a particular term, e.g., the term "probably," may be associated with a more formal, canonical pronunciation, e.g., "prahb-eb-lee," a pronunciation of informal, canonical pronunciations, e.g., "prah-lee," "prob-lee," etc., one or more regional pronunciations, and other possible pronunciations.

Phonetic dictionaries, for example, may be compiled from various published sources and/or speech samples. The age-restricted phonetic dictionary 230 also includes a list of terms and age-appropriate phonetic representations of the terms. The indications of age-appropriateness for the canonical representation of each term in the age-restricted phonetic dictionary 230 can be, for example, a numerical value for a maximum age and can be obtained from, for example, a database of pre-determined and established canonical pronunciations of different words or terms that are accepted as appropriate for different phases of growth in a child. Note that the contents of the database can be manually curated, or developed based on applying various rules to different words to automatically generate a set of canonical pronunciations for the words.

The speech recognition server 202 may access a phonetic representation estimator 232, e.g., a hardware and/or software-based module, to estimate a phonetic representation, e.g., a pronunciation, of a term based on its spelling. If a phonetic representation for a particular term is unknown or missing from the age-restricted phonetic dictionary 230, for example, the speech recognition server 202 may use the phonetic representation estimator 232 to identify a likely pronunciation for the term, based on a set of language-based phonetic rules. In general, phonetic representations may be unknown or missing from a phonetic dictionary for newly coined or newly introduced terms that have not yet been analyzed and/or associated with speech data from a user or from a suitably large population of users.

The speech recognition server 202 may access a phonetic dictionary optimizer 234, e.g., a hardware and/or software-based module, to update one or more phonetic dictionaries. For example, if the speech recognition server 202 determines that a phonetic representation of particular term in the age-restricted phonetic dictionary 230 is unknown, missing, or incorrect, the phonetic dictionary optimizer 234 may update the dictionary. As another example, the phonetic dictionary optimizer 234 may periodically update the age-restricted phonetic dictionary 230 as part of a batch process.

To generate a transcription of an utterance or a word such as "car," for example, the speech recognition server 202 can access one or more phonetic dictionaries, e.g., age-restricted phonetic dictionary 230, to identify an association between the series of phones and one or more words or phrases, and can perform various speech recognition techniques, e.g., Hidden Markov models, neural networks, or other appropriate techniques. Moreover, in some implementations, audio data may be used to provide training examples for one or more models used for performing speech recognition. In general, phonetic dictionaries may be updated by the system 200 for use in speech recognition.

Figure 3:
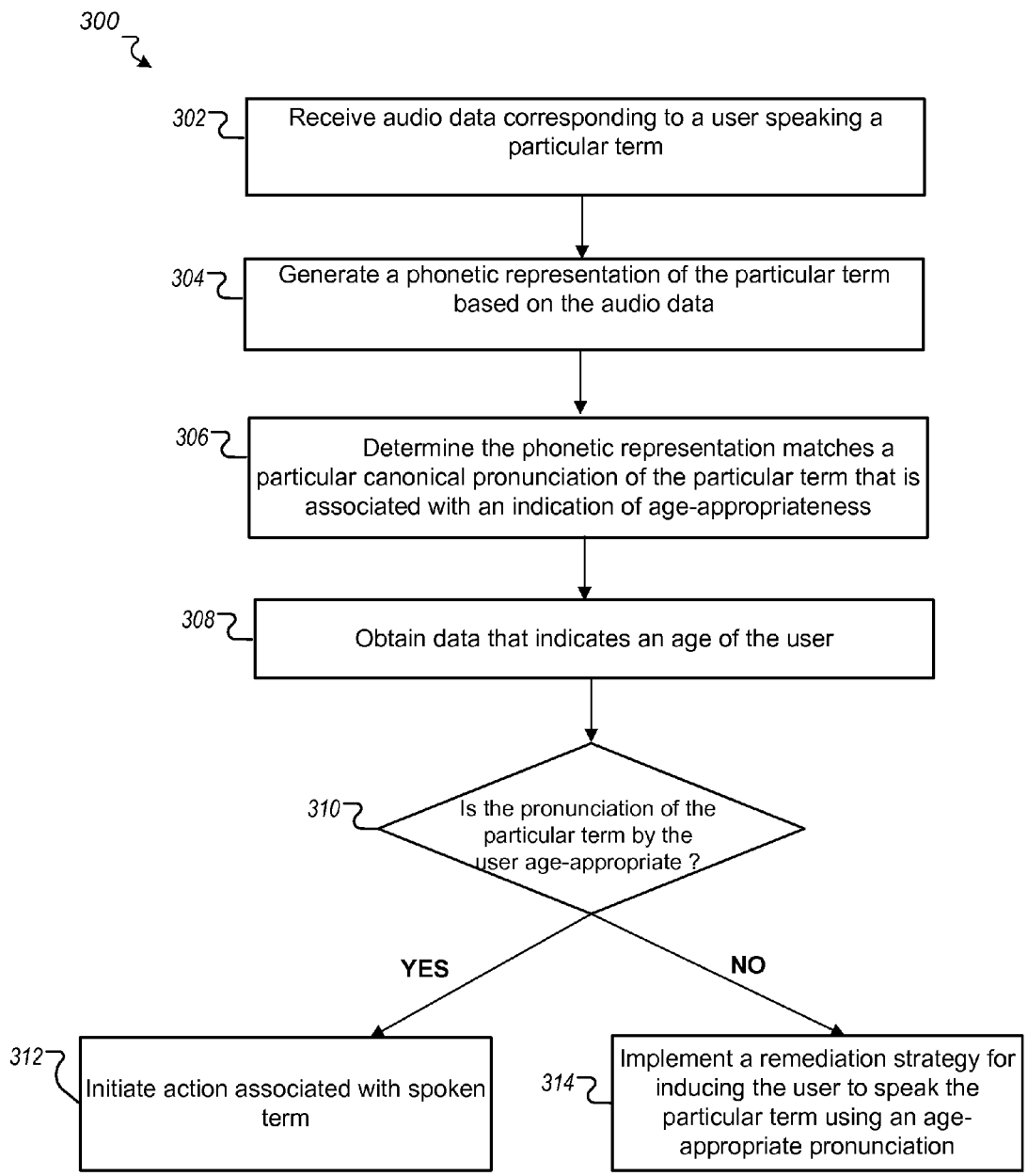
FIG. 3 is a flow chart illustrating an example process for inducing a child to adjust the pronunciation of their spoken terms.

FIG. 3 is a flow chart illustrating an example process 300 for inducing a child to adjust the pronunciation of their spoken terms. In some implementations, the process 300 may be performed by the systems 100 and/or 200, and will be described as such for clarity. Briefly, the process 300 includes receiving audio data corresponding to a user speaking a particular term, generating a phonetic representation of the particular term based on the audio data, determining the phonetic representation matches a particular canonical pronunciation of the particular term that is associated with an indication of age-appropriateness, obtaining data that indicates an age of the user, determining if the pronunciation of the particular term by the user is age-appropriate, and implementing a remediation strategy for inducing the user to speak the particular term using an age-appropriate pronunciation if it is determined that the pronunciation of the particular term by the user is not age-appropriate.

In more detail, the process 300 begins at 302, where audio data corresponding to a user speaking a particular term is received at, for example, an automated speech recognition server. The audio data can be sent from for example, a computing device associated with the user. Examples of audio data can be voice queries, commands, communications, etc. The automated speech recognition server is similar to the ASR server 102 shown in FIG. 1 and the speech recognition server 202 shown in FIG. 2.

At 304, a phonetic representation of the particular term is generated at, for example, the automated speech recognition server. As described above, the automated speech recognition server can analyze acoustic signals included in the audio data, and can compute and classify sound features to identify a series of phones and thus generate a phonetic representation of the particular term spoken by the user from the audio data. To generate a transcription of an utterance or the particular term spoken by the user or a word such as "car," for example, the automated speech recognition server can access one or more phonetic dictionaries to identify an association between the series of phones and one or more words or phrases, and can perform various speech recognition techniques, e.g., Hidden Markov models, neural networks, or other appropriate techniques.

At 306, a determination is made if the generated phonetic representation of the particular term matches a particular canonical pronunciation of the particular term that is associated with an indication of age-appropriateness. The determination can be made at, for example, the automated speech recognition server by matching the generated phonetic representations to the entries stored in an age-restricted phonetic dictionary, e.g., age-restricted phonetic dictionary 116 shown in FIG. 1, located in or operably coupled to the automated speech recognition server. A particular canonical pronunciation from the set of canonical pronunciations stored in the age-appropriate phonetic dictionary is selected that best matches the generated phonetic representation spoken by the user.

At 308, data is obtained indicates an age of the user. As described above, the data indicating an age of the user can be stored in for example, the user profile associated with the user. The data can include, for example, a numerical value representing the age of the user, a date of birth, and/or the like. The user profile can be stored in a database on the computing device and/or the automated speech recognition server.

At 310, a determination is made if the pronunciation of the particular term by the user is age-appropriate. The determination can be made at, for example, the automated speech recognition server. The automated speech recognition server can determine based on a comparison of the data that indicates an age of the user, e.g., estimated from the user profile, and the indication of age-appropriateness that is associated with the particular or selected canonical pronunciation of the particular term, e.g., obtained from the age-restricted phonetic dictionary 116 shown in FIG. 1 whether the pronunciation of the particular term user is age-appropriate. As described above, the indication of the age-appropriateness as shown in the age-appropriate phonetic dictionary is an indication of a maximum age associated with a canonical representation of a particular term. The automated speech recognition server determines if the user spoke an age-appropriate pronunciation by determining if the age of the user is less than or equal to the maximum age associated with a canonical representation of the particular term.

If the age of the user is less than or equal to the maximum age associated with the canonical representation of the particular term, it is determined that the pronunciation of the particular term by the user is age-appropriate. The signal can be sent from, for example, the automated speech recognition server to, for example, a computing device associated with the user to initiate an action associated with the spoken term, at 312. Examples of actions can be to display a picture associated with the spoken term, run an application associated with the spoken term, play music associated with the spoken term, and/or the like.

If the age of the user is greater than the maximum age associated with the canonical representation of the particular term, it is determined that the pronunciation of the particular term by the user is not age-appropriate. The signal can be sent from, for example, the automated speech recognition server to, for example, a computing device associated with the user to implement a remediation strategy for inducing the user to speak the particular term using an age-appropriate pronunciation, at 314. Examples of remediation strategies are described below.

In some instances, the automated speech recognition server can generate an audio signal and transmitting the audio signal to the computing device associated with the user. The audio signal can prompt the user to speak the particular term again. The remediation strategy can encourage the user to improve the pronunciation of the term in the repeat cycle.

In other instances, the automated speech recognition server can generate an audio signal and transmitting the audio signal to the computing device associated with the user. The audio signal can output audio data corresponding to a pronunciation of the particular term that is not age-appropriate. The audio data output by the computing device can be substantially identical to the audio data received by the automated speech recognition server and/or the computing device corresponding to the user speaking the particular term.

In other instances, the automated speech recognition server can generate an audio signal and transmit the audio signal to the computing device associated with the user. The audio signal can output audio data corresponding to a pronunciation of the particular term that is age-appropriate. The automated speech recognition server can select another canonical pronunciation of the particular term that is determined to be age-appropriate. The remediation strategy can encourage the user to learn the age-appropriate pronunciation of the particular term from listening to the audio data output from the computing device.

In other instances, the automated speech recognition server sends a signal to the computing device to initiate an action associated with the particular term spoken by the user despite the determination that the pronunciation of the particular term by the user is not age-appropriate. The remediation strategy can be implemented if the automated speech recognition server can detect if the user is in a state of high anxiety, angry, etc.

In yet other instances, the automated speech recognition server can generate and send a signal (or a message) to another person within a pre-determined distance of the user indicating that the pronunciation of the particular term by the user is not age-appropriate. The remediation strategy can encourage the other person to help the user to improve their pronunciation of the particular term.

Figure 4:
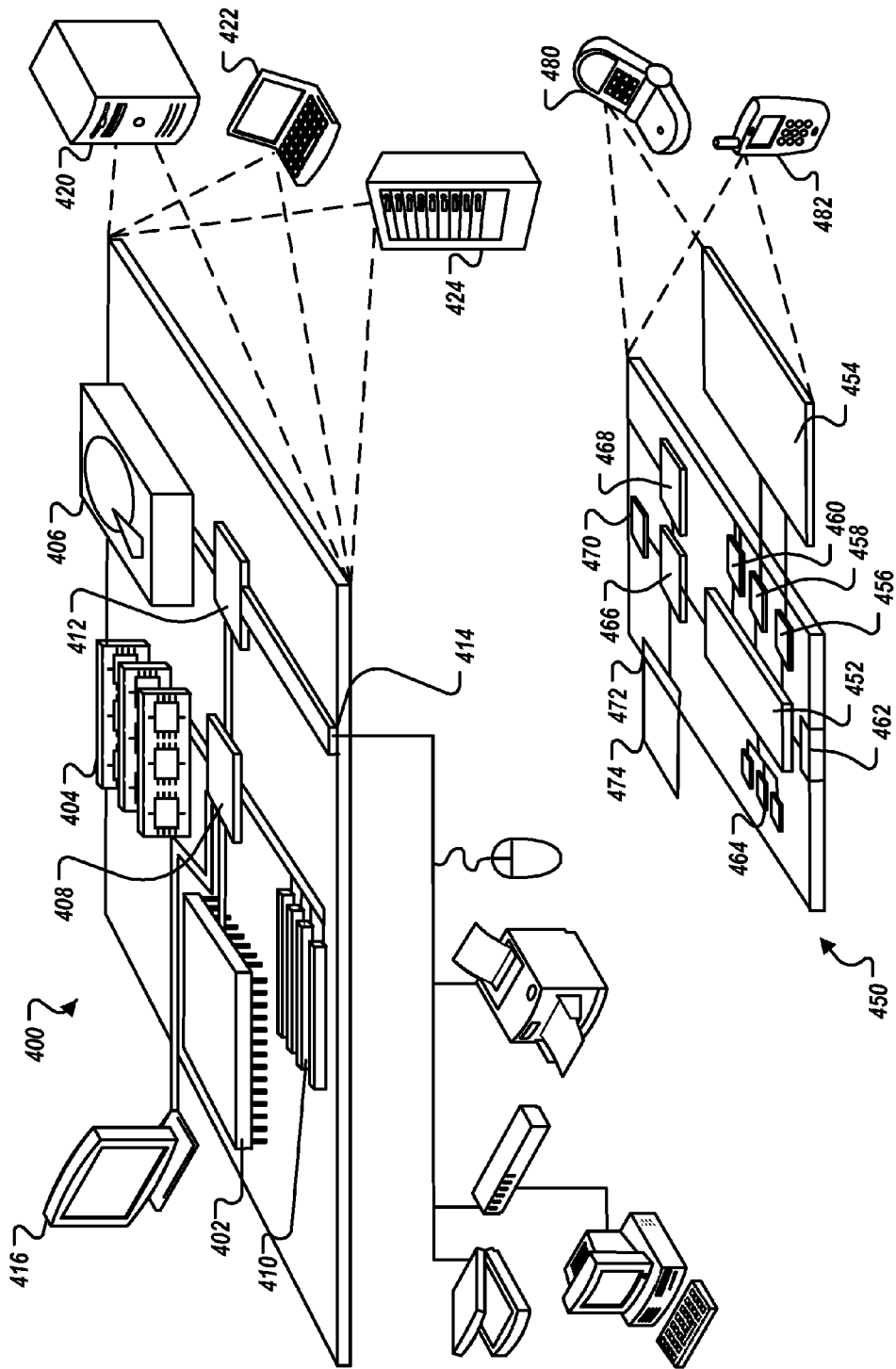
FIG. 4 shows an example of a computer device in which the process of FIG. 3 may be implemented.

FIG. 4 shows an example of a computer device in which the process of FIG. 3 may be implemented. In particular, FIG. 4 shows an example of a computer device 400 and a (mobile) computing device 450, which may be used with the techniques described herein. Computer device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computer device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computer devices 400 may be connected, with each device providing portions of the necessary operations, e.g., as a server bank, a group of blade servers, or a multi-processor system.

The memory 404 stores information within the computer device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computer device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computer device 400, while the low speed controller 412 manages lower bandwidth-intensive operations. The allocation of functions is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computer device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computer device 400 may be combined with other components in a mobile device (not shown), such as device 450. Each of such devices may contain one or more of computer device 400, computing 450, and an entire system may be made up of multiple devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of computing device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to computing device 450 through expansion interface 472, which may include, for example, a SIMM (Single In Line Memory Module) card interface. The expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. The communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. The sound may include sound from voice telephone calls, may include recorded sound, e.g., voice messages, music files, etc., and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other similar mobile device.

It is to be noted that the ASR server 102 described in FIG. 1 may include one or more processors configured to execute instructions stored by a computer-readable medium for performing various operations, such as input/output, communication, data processing, and the like. The ASR server 102 may communicate and with other portable or stationary computing devices, e.g., other servers, personal computers, smartphones, or other appropriate computing devices, using wired and/or wireless network connections. Operations performed by the ASR server 102 may be performed by a single server, or may be distributed to various other servers, e.g., servers included in a cloud computing and/or a peer-to-peer configuration.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs are also known as programs, software, software applications or code, and can include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The systems and techniques described here may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the systems and techniques described here, or any combination of back end, middleware, or front end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving audio data corresponding to a user speaking a particular term;
   generating, by an automated speech recognizer, a phonetic representation of the particular term based on the audio data;
   accessing a database of canonical pronunciations of terms that are used by the automated speech recognizer in transcribing utterances, wherein one or more of the canonical pronunciations are associated with an indication of age-appropriateness;
   determining that, in the database of canonical pronunciations of terms that are used by the automated speech recognizer in transcribing utterances, the phonetic representation matches a particular canonical pronunciation of a particular term, wherein the particular canonical pronunciation is associated with the indication of age-appropriateness;
   obtaining data that indicates an age of the user;
   determining, based on a comparison of (i) the data that indicates the age of the user and (ii) indication of age-appropriateness that is associated with the particular canonical pronunciation of the particular term, that the pronunciation of the particular term by the user is not age-appropriate;
   based on determining that the pronunciation of the particular term by the user is not age appropriate, selecting a remediation strategy for inducing the user to speak the particular term using an age-appropriate pronunciation, and providing, for output, a transcription of the audio data, or of subsequently received audio data, that is generated by the automated speech recognizer.

2. The computer-implemented method of claim 1, comprising:
   selecting, from among the plurality of canonical pronunciations stored in the database of canonical pronunciations of terms that are used by the automated speech recognizer in transcribing utterances, the particular canonical pronunciation as a best match of the phonetic representation generated of the particular term.

3. The computer-implemented method of claim 2, comprising:
   storing, in the database, a plurality of canonical pronunciations associated with the particular term, wherein the plurality of canonical pronunciations includes the particular canonical pronunciation selected for the particular term, and wherein two or more of the plurality of canonical pronunciations include an indication of age-appropriateness.

4. The computer-implemented method of claim 1, wherein the indication of age-appropriateness comprises a maximum age, and wherein, determining that the pronunciation of the particular term by the user is not age-appropriate comprises determining that the age of the user is greater than the maximum age.

5. The computer-implemented method of claim 1, wherein the remediation strategy for inducing the user to speak the particular term using an age-appropriate pronunciation involves prompting the user to speak the particular term again.

6. The computer-implemented method of claim 1, wherein the remediation strategy for inducing the user to speak the particular term using an age-appropriate pronunciation involves outputting audio data corresponding to a pronunciation of the particular term that not age-appropriate.

7. The computer-implemented method of claim 6, wherein outputting audio data corresponding to a pronunciation of the particular term that is not age-appropriate comprises outputting the received audio data corresponding to the user speaking the particular term.

8. The computer-implemented method of claim 6, wherein outputting audio data corresponding to a pronunciation of the particular term that is not age-appropriate comprises generating a text-to-speech output using the particular canonical representation that matches the phonetic representation.

9. The computer-implemented method of claim 1, wherein the remediation strategy for inducing the user to speak the particular term using an age-appropriate pronunciation involves (i) selecting another canonical pronunciation of the particular term that is determined to be age-appropriate, and (ii) outputting audio data corresponding to the selected other canonical pronunciation.

10. The computer-implemented method of claim 1, wherein the remediation strategy for inducing the user to speak the particular term using an age-appropriate pronunciation involves initiating an action associated with the particular term despite the determination that the pronunciation of the particular term by the user is not age-appropriate.

11. The computer-implemented method of claim 1, comprising:
before selecting a remediation strategy, obtaining biometric data associated with the user; and
determining that the biometric data satisfies a predetermined emotional threshold, wherein the remediation strategy is selected based on determining that the biometric data satisfies the predetermined emotional threshold.

12. The computer-implemented method of claim 1, wherein the remediation strategy for inducing the user to speak the particular term using an age-appropriate pronunciation involves (i) detecting another person within a predetermined distance of the user, and (ii) sending a message to the other person indicating that the pronunciation of the particular term by the user is not age-appropriate.

13. The computer-implemented method of claim 1, comprising:
after selecting the remediation strategy, receiving, additional audio data corresponding to the user speaking the particular term again;
generating a phonetic representation of the particular term based on the additional audio data;
determining that the phonetic representation of the particular term in the additional audio data matches an age-appropriate canonical pronunciation of the particular term; and based on determining the phonetic representation of the particular term in the additional audio data matches an age-appropriate canonical pronunciation of the particular term, initiating an action associated with the particular term.

14. A system, comprising:
one or more computers programmed to perform operations comprising:
receiving audio data corresponding to a user speaking a particular term;
generating, by an automated speech recognizer, a phonetic representation of the particular term based on the audio data;
accessing a database of canonical pronunciations of terms that are used by the automated speech recognizer in transcribing utterances, wherein one or more of the canonical pronunciations are associated with an indication of age-appropriateness;
determining that, in the database of canonical pronunciations of terms that are used by the automated speech recognizer in transcribing utterances, the phonetic representation matches a particular canonical pronunciation of a particular term, wherein the particular canonical pronunciation is associated with the indication of age-appropriateness;
obtaining data that indicates an age of the user;
determining, based on a comparison of (i) the data that indicates the age of the user and (ii) indication of age-appropriateness that is associated with the particular canonical pronunciation of the particular term, that the pronunciation of the particular term by the user is not age-appropriate;
based on determining that the pronunciation of the particular term by the user is not age appropriate, selecting a remediation strategy for inducing the user to speak the particular term using an age-appropriate pronunciation, and providing, for output, a transcription of the audio data, or of subsequently received audio data, that is generated by the automated speech recognizer.

15. The system of claim 14, wherein the operations further comprise selecting from among the plurality of canonical pronunciations stored in the database of canonical pronunciations of terms that are used by the automated speech recognizer in transcribing utterances, the particular canonical pronunciation as a best match of the phonetic representation generated of the particular term.

16. The system of claim 14, wherein the operations further comprise storing in the phonetic dictionary, a plurality of canonical pronunciations associated with the particular term, wherein the plurality of canonical pronunciations includes the particular canonical pronunciation selected for the particular term, and wherein two or more of the plurality of canonical pronunciations include an indication of age-appropriateness.

17. The system of claim 14, wherein the indication of age-appropriateness comprises a maximum age, and wherein determining that the pronunciation of the particular term by the user is not age-appropriate comprises determining that the age of the user is greater than the maximum age.

18. A non-transitory computer readable storage medium encoded with a computer program, the program comprising instructions that when executed by data processing apparatus cause the data processing apparatus to perform operations comprising:
receiving audio data corresponding to a user speaking a particular term;

generating, by an automated speech recognizer, a phonetic representation of the particular term based on the audio data;

accessing a database of canonical pronunciations of terms that are used by the automated speech recognizer in transcribing utterances, wherein one or more of the canonical pronunciations are associated with an indication of age-appropriateness;

determining that, in the database of canonical pronunciations of terms that are used by the automated speech recognizer in transcribing utterances, the phonetic representation matches a particular canonical pronunciation of a particular term, wherein the particular canonical pronunciation is associated with the indication of age-appropriateness;

obtaining data that indicates an age of the user;

determining, based on a comparison of (i) the data that indicates the age of the user and (ii) indication of age-appropriateness that is associated with the particular canonical pronunciation of the particular term, that the pronunciation of the particular term by the user is not age-appropriate;

based on determining that the pronunciation of the particular term by the user is not age appropriate, selecting a remediation strategy for inducing the user to speak the particular term using an age-appropriate pronunciation, and providing, for output, a transcription of the audio data, or of subsequently received audio data, that is generated by the automated speech recognizer.

19. The computer readable storage medium of claim 18, wherein the operations further comprise selecting from among the plurality of canonical pronunciations stored in the database of canonical pronunciations of terms that are used by the automated speech recognizer in transcribing utterances, the particular canonical pronunciation as a best match of the phonetic representation generated of the particular term.

20. The computer readable storage medium of claim 18, wherein the operations further comprise storing in the phonetic dictionary, a plurality of canonical pronunciations associated with the particular term, wherein the plurality of canonical pronunciations includes the particular canonical pronunciation selected for the particular term, and wherein two or more of the plurality of canonical pronunciations include an indication of age-appropriateness.

* * * * *